United States Patent Office 2,733,682
Patented Feb. 7, 1956

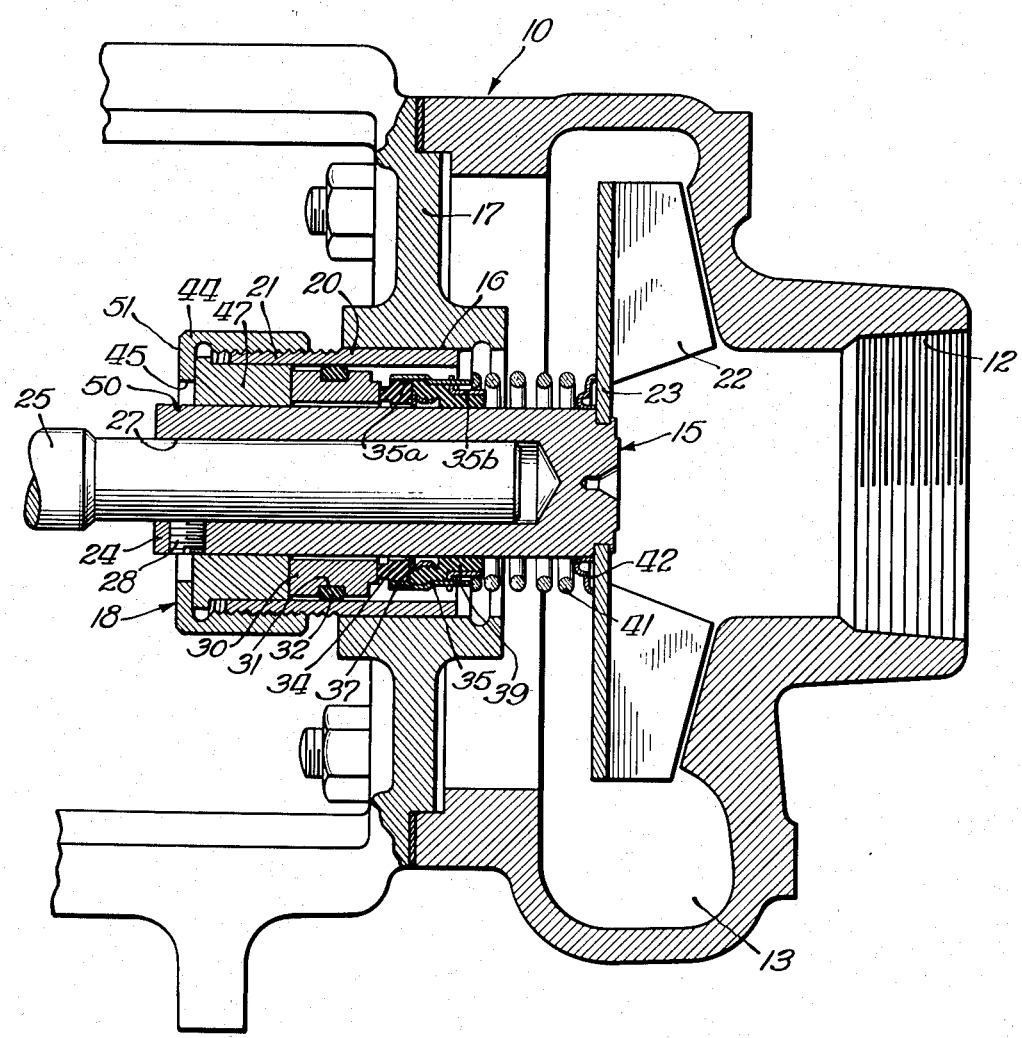

2,733,682

PUMP SHAFT INDEXING MEANS

Richard Russell Langteau, Beloit, Wis., assignor to Fairbanks, Morse & Co., Chicago, Ill., a corporation of Illinois Application March 20, 1952, Serial No. 277,674

1 Claim. (Cl. 116—124)

This invention relates to improvements in sealing means for pump shafts. More particularly it has to do with an improved shaft seal featuring novel means for mounting a fluid sealing assembly relative to a rotatable pump shaft in which the sealing engagement of the relatively rotating elements of the seal assembly with each other is maintained under a predetermined pressure.

It is an object of the present invention to provide a novel shaft seal assembly having adjustable means whereby relatively rotating sealing elements may be pressed into engagement under a pressure that assures an effective sealing engagement.

Another object of the present invention is the provision of a seal assembly for a rotatable shaft which, after being disassembled, can be quickly and accurately reassembled so that the sealing surfaces of the assembly engage each other with the same pressure that they exerted before the seal was disassembled.

A further object of the present invention is the provision of a pump shaft seal having index means which facilitate the installation of the seal under predetermined optimum pressure conditions.

According to the general features of the present invention, a seal is operatively related to a pump drive shaft or more particularly as in the present exemplary embodiment, to a tubular shaft mounting hub of the pump rotor in the portion thereof extending through an opening in the pump casing. The seal includes two generally circular sealing members disposed around the pump shaft mounting hub and having opposed, precision lapped faces which are adapted to be brought together to form a liquid-tight seal in a plane transverse to the axis of the hub. A coil spring is positioned around the hub between one of the sealing members and the blade-carrying plate of an impeller which is mounted on the end of the hub. The two sealing members are urged into engagement with each other by threading a cap onto a fixed, axially projecting sleeve of the casing. The cap, which has a central opening through which the hub extends, is arranged to urge a cylindrical pressure member axially along the shaft into contact with one of the sealing members. As the cap is screwed onto the casing sleeve, the two sealing members are pressed together in sealing engagement against the resistance of the spring which is compressed as the cap is screwed down.

A special feature of the present invention is the provision of an index mark on the portion of the hub that extends through the central opening in the cap. By threading the cap onto the fixed sleeve to a point where the index mark is aligned with the end face of the cap, the compressible sealing element can be subjected to the same predetermined, advantageous pressure each time the seal is assembled on the shaft.

Other and further objects, features and advantages of the present invention will become apparent to one skilled in the art from the following detailed description taken in connection with the accompanying drawing.

Referring to the drawing, which illustrates a preferred embodiment of the present invention, the reference numeral 10 indicates the casing of a pump having an axial liquid inlet passage 12 and a substantially circular discharge passage 13. An impeller assembly 15 is supported in an opening 16 of a transverse wall 17 of the casing and is provided with a shaft seal assembly 18. A cylindrical sleeve 20, which has an exteriorly threaded end 21, is rigidly secured, as by a press fit, in the opening 16.

The impeller includes a plurality of blades 22 secured to a shroud or plate 23. The plate is fixedly mounted on a hub or shaft extension 24 that is in the form of a cylinder closed at one end. One end of a power driven shaft 25 extends into a central opening 27 of the shaft extension 24 and is keyed therein by a setscrew 28.

The seal assembly 18, illustrated in the drawing, is a typical mechanical seal for a pump shaft and includes an annular seat 30 disposed around the shaft extension or hub 24 in spaced relation thereto. This seat 30 has a groove 31 formed in its outer peripheral surface and arranged to receive and retain a seal ring 32 which may be made of resilient material, such as rubber. The ring 32 sealingly engages the inner surface of the sleeve 20. A generally cylindrical washer 34, preferably made of carbon, is disposed freely around the hub adjacent the seat 30. The washer 34 and the seat 30 have precision lapped confronting faces which, when brought together under a predetermined pressure, form a liquid-tight seal in a plane transverse to the axis of the hub. The washer 34 is rotated with the impeller hub or shaft extension 24 through a retainer shell 35 that has a notched engagement, as at 37, with the periphery of the washer. The shell 35 is formed of two interconnected members 35a and 35b, and is driven by a compressible sealing ring 39 of generally cylindrical configuration, which may be suitably made of synthetic rubber and disposed in frictional driven engagement with the shaft extension 24 and with the retainer shell 35. A coil spring 41 bottoms at one end of a circular spring-positioning member 42 abutting the impeller plate 23, and at the other end abuts the end face of the shell 35. The spring 41 aids in compressing the rubber ring into frictional driving engagement and fluid-sealing engagement with the shaft extension 24, and serves to bias the washer 34 to a firm, pressure sealing engagement of its face with the normally stationary seat 30.

A cap 44 is threaded on the sleeve 21. This cap, which has a central opening 45 through which the shaft extension 24 projects, engages a slidable, cylindrical pressure-applying ring 47 in abutment with the seat 30. Thus the cap 44 and the ring 47 constitute pressure-applying members on one side of the seal assembly and the spring 41 constitutes a pressure-applying member on the other side of the seal assembly.

It will be evident that a definite amount of pressure must be applied to the seal elements to maintain a driving engagement between the rubber sealing ring 39 and the shaft extension 24, and to retain the sealing faces of the washer 34 and the seat 30 in effective sealing contact. In a given installation, there is a definite, most efficient pressure which will obtain these results while imposing a minimum amount of drag on the rotating shaft.

In the present invention the amount of pressure applied to the seal assembly is directly proportional to the displacement of the spring 41 during compression. Therefore, after the most advantageous pressure is determined by test, the seal is assembled on the shaft and the cap 44 is screwed onto the sleeve 20 until the spring 41 is compressed sufficiently to apply the required pressure on the seal. A V-groove 50 is then cut in the periphery of the shaft extension 24 directly in line with the face 51 of the cap 44. Thereafter, if the seal assembly is removed for servicing or replacement by a similar seal assembly, in order to put the new seal under the same amount of pressure, it will be necessary only to screw the cap 44 down until the V-groove 50 is aligned with the face of the cap. This adjustment feature also is effective in instances of necessary re-adjustment of the hub 24 longitudinally of the drive shaft 25 for clearance take-up adjustments of the impeller 22–23.

It will be evident of course that the most advantageous pressure that is to be applied to the seal assembly can be determined by installing the seal assembly in the pump, operating the pump under liquid-pumping conditions, and adjusting the setting of the cap until the best setting is obtained. Then the V-groove 50 can be cut in the shaft opposite the end face of the cap.

It will be understood that modifications and variations may be effected without departing from the scope of the novel concepts of the present invention.

I claim:

In a fluid seal for a rotary shaft member of a fluid pump or the like providing a casing having an opening through which the shaft member projects into the casing, and wherein the shaft member has an abutment at its end in the casing and the casing includes a threaded tubular member projecting externally of the casing co-axially of the casing opening, the shaft seal including a pair of laterally abutting seal ring elements about the shaft member, a compression spring encircling the shaft member between said abutment of the shaft member and one seal ring element, the spring biasing said one seal ring element to lateral abutment with the other seal ring element, and adjustable means including a cap element threadedly engaged on said threaded tubular member, for retaining said other seal ring element in lateral abutment with said one seal ring element and serving through threading up of the cap element on the tubular member to a determined position thereon, to position the laterally abutting seal ring elements longitudinally of the shaft member such that said compression spring then is compressed to the extent required for maximum sealing effectiveness of said laterally abutting seal ring elements, that improvement therein which comprises spring-compression indexing means comprising a reference surface on the cap element, and in index groove in a peripheral surface portion of the shaft member and so located therein that said cap reference surface will be in registry with said index groove upon threading up of the cap element to said determined position on the tubular member, thereby to provide visual indication of the attainment of said required extent of compression of said spring.

References Cited in the file of this patent

UNITED STATES PATENTS

| 1,019,300 | Burby | Mar. 5, 1912 |
| 1,295,974 | Dron et al. | Mar. 4, 1919 |
| 1,663,341 | Johnson | Mar. 20, 1928 |
| 1,962,112 | Couch | June 12, 1934 |
| 2,057,205 | Petersen | Oct. 13, 1936 |
| 2,182,072 | Czarnecki | Dec. 5, 1939 |
| 2,328,328 | Curtis | Aug. 31, 1943 |
| 2,474,298 | Zeidler | June 28, 1949 |

FOREIGN PATENTS

| 11,958 | Australia | of 1928 |